United States Patent

Wu

[11] Patent Number: 5,768,975
[45] Date of Patent: Jun. 23, 1998

[54] BUBBLE-FORMING SLEEVE FOR AN ESPRESSO COFFEE MAKER

[75] Inventor: Tsan-Kuen Wu, Tainen Hsien, Taiwan

[73] Assignee: Tsann Kuen USA Inc., Pasadena, Calif.

[21] Appl. No.: 895,134

[22] Filed: Jul. 16, 1997

[51] Int. Cl.$^6$ ............................ A47J 31/40; A47J 31/46; A47J 43/12; B01F 13/02
[52] U.S. Cl. ................................ 99/290; 99/295; 99/300; 99/323.1; 99/452
[58] Field of Search ............................ 99/275, 452, 453, 99/279, 290–295, 300, 454, 302 R, 323.1, 323.3; 261/76, DIG. 16, DIG. 76

[56] References Cited

U.S. PATENT DOCUMENTS

| | | | |
|---|---|---|---|
| 1,588,769 | 6/1926 | Viser | 99/293 |
| 3,641,918 | 2/1972 | Schellgell et al. | 99/279 |
| 4,660,466 | 4/1987 | Fries et al. | 99/294 |
| 4,735,133 | 4/1988 | Paoletti | 99/454 |
| 5,052,289 | 10/1991 | Di Girolamo | 99/452 |
| 5,165,520 | 11/1992 | Giuliano | 99/323.1 |
| 5,189,949 | 3/1993 | Apa | 99/453 |
| 5,295,431 | 3/1994 | Schiettecatte | 99/323.1 |
| 5,309,960 | 5/1994 | Boyd | 99/452 X |
| 5,330,266 | 7/1994 | Stubaus | 99/293 |
| 5,423,245 | 6/1995 | Midden | 99/452 |
| 5,473,972 | 12/1995 | Rizzuto | 99/290 |
| 5,509,349 | 4/1996 | Anderson et al. | 99/452 X |

Primary Examiner—Timothy F. Simone
Attorney, Agent, or Firm—Marshall & Melhorn

[57] ABSTRACT

A bubble-forming sleeve for an espresso coffee maker includes a generally vertical sleeving portion which has a central bore formed therethrough and which is sleeved fixedly on a nozzle that is fixed on an end of a vapor tube of the coffee maker in such a manner that a liquid-tight seal is established between the nozzle and the sleeving portion, and a mixing portion which is attached around a lower end portion of the sleeving portion and which is immersed entirely into the beverage within the container. The mixing portion has a downwardly opened mixing chamber which is located under and which is communicated fluidly with the central bore of the sleeving portion so as to permit vapor flow from the nozzle into the chamber, and a generally vertical air passage unit which is communicated fluidly with the chamber at a lower end and with an exterior of the sleeve at an upper end. Heated vapor flows downward from the chamber so as to heat the beverage within the container and so as to draw the beverage in the container into the chamber via the air passage unit, thereby forming bubbles of the beverage in the container.

4 Claims, 3 Drawing Sheets

BUBBLE-FORMING SLEEVE FOR AN ESPRESSO COFFEE MAKER

BACKGROUND OF THE INVENTION

1. Field of the Invention

This invention relates to an espresso coffee maker, more particularly to a sleeve which is sleeved on a vapor tube of an espresso coffee maker and which is immersed into a beverage, such as milk, within a container so as to form bubbles of the beverage in the container.

2. Description of the Related Art

In either of U.S. Pat. Nos. 5,628,239 and 4,921,640 which are issued to the applicant and which disclosed two bubble-forming devices, high-temperature vapor created in an espresso coffee maker is used to draw and mix with a beverage in order to form bubbles of the beverage by the principle of a venturi tube. Although such a bubble-forming device can produce bubbles effectively, the ranges of the sizes of some parts thereof are limited, and a branch pipe is needed therefor. As a result, it is difficult to manufacture and clean the devices disclosed in U.S. Pat. Nos. 5,628,239 and 4,921,640.

SUMMARY OF THE INVENTION

An object of this invention is to provide an espresso coffee maker with a bubble-forming sleeve which is immersed into a beverage within a container in order to form bubbles of the beverage within the container, and which can be easily manufactured and cleaned.

According to this invention, a bubble-forming sleeve for an espresso coffee maker includes a generally vertical sleeving portion which has a central bore formed therethrough and which is adapted to be sleeved fixedly on a nozzle that is fixed on an end of a vapor tube of the coffee maker in such a manner that a liquid-tight seal is established between the nozzle and the sleeving portion, and a mixing portion which is attached around a lower end portion of the sleeving portion and which is adapted to be immersed entirely into the beverage within the container. The mixing portion has a downwardly opened mixing chamber which is located under and which is communicated fluidly with the central bore of the sleeving portion so as to be adapted to permit vapor flow from the nozzle into the chamber, and a generally vertical air passage unit which is communicated fluidly with the chamber at a lower end and with an exterior of the sleeve at an upper end. Heated vapor can flow downward from the chamber so as to heat the beverage within the container and so as to draw the beverage in the container into the chamber via the air passage unit, thereby forming bubbles of the beverage in the container.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENT

Figure 1:
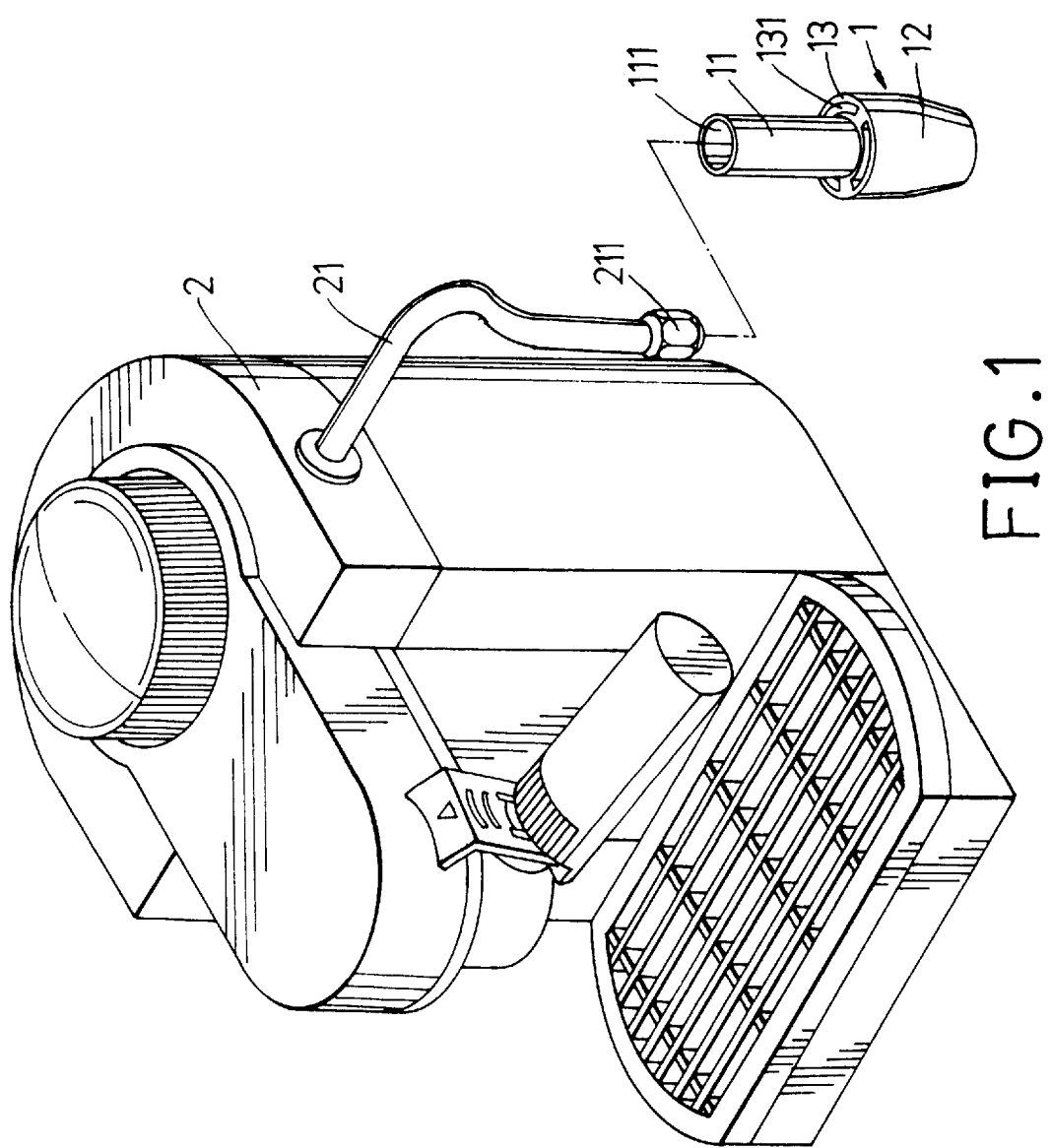
FIG. 1 is a perspective view of a bubble-forming sleeve of this invention, shown together with an espresso coffee maker.
Figure 2:
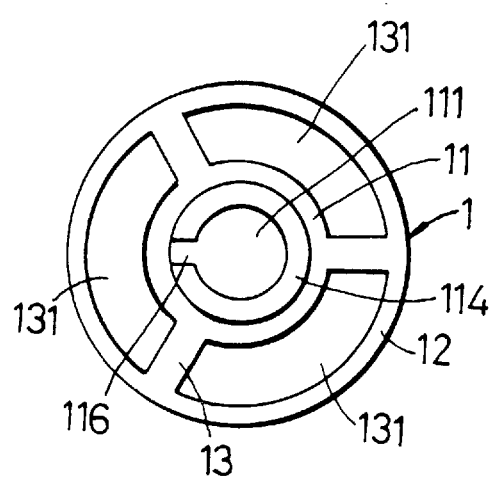
FIG. 2 is a top view of the bubble-forming sleeve of this invention.
Figure 3:
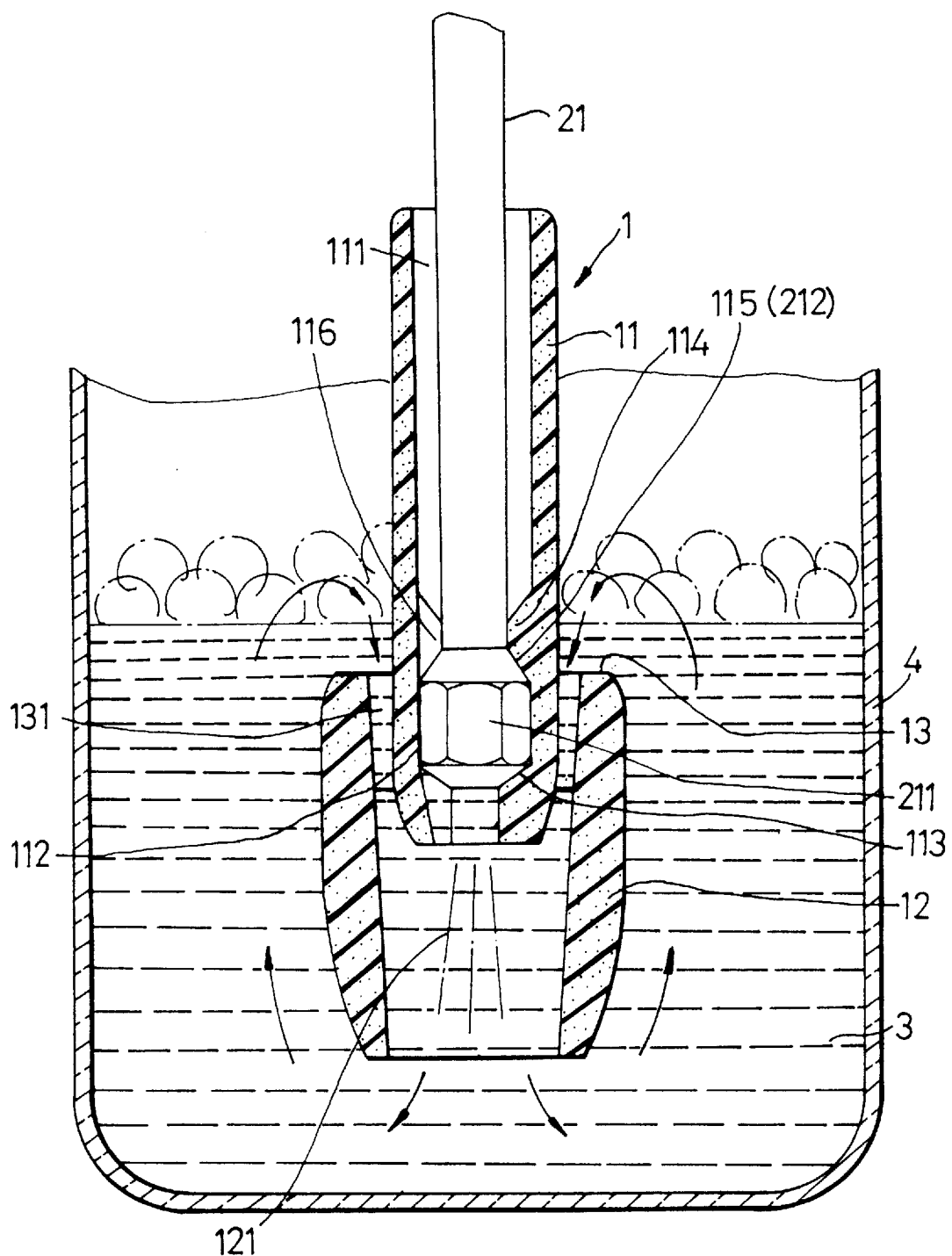
FIG. 3 is a schematic sectional view illustrating how the bubble-forming sleeve of this invention is immersed into milk within a container.

Referring to FIGS. 1 to 3, a bubble-forming sleeve 1 is adapted to be coupled with an espresso coffee maker 2 (see FIG. 1) and is adapted to be immersed into a beverage 3 (see FIG. 3), such as milk, within a container 4 (see FIG. 3). The coffee maker 2 is provided with a vapor tube 21 which has a lower end that is provided with a nozzle 211. The nozzle 211 has a lower end portion from which vapor flows downward.

The sleeve 1 is made of a heat-resistant elastic material, such as rubber in the preferred embodiment, and has a generally vertical sleeving portion 11 and a mixing portion 12 which are integrally formed with each other and which define a shoulder 13 therebetween. The sleeving portion 1 is located at an upper end portion of the sleeve 1 and is adapted to be sleeved fixedly on the nozzle 211 in such a manner that a liquid-tight seal is established therebetween.

The mixing portion 12 is located around a lower end portion of the sleeving portion 11 and is adapted to be immersed entirely into the beverage 3 within the container 4. A downwardly opened mixing chamber 121 is formed in the mixing portion 12 under a central bore 111 through the sleeving portion 11 so as to be adapted to permit vapor flow from the nozzle 211 of the vapor tube 21 into the chamber 121 of the sleeving portion 12. The mixing portion 12 further has a generally vertical air passage unit which consists of three vertical air passages 131. As illustrated, each of the air passages 131 has a lower end which is communicated fluidly with the chamber 121, and an upper end which is communicated fluidly with an exterior of the sleeve 1.

Heated vapor flows downward from the chamber 121 of the mixing portion 12 so as to heat the beverage 3 in the container 4 and so as to draw the beverage 3 in the container 4 into the chamber 121 via the air passages 131, according to principle of a venturi tube, thereby forming bubbles of the beverage 3 in the container 4. In this way, the beverage 3 circulates in the container 4 in directions indicated by the arrowheads in FIG. 3, thereby enhancing formation of bubbles of the beverage 3 on the beverage surface in the top of the container 4. Because the air passages 131 are all formed axially of the sleeve 1, the latter can be easily cleaned after use.

The central bore 111 of the sleeving portion 11 of the sleeve 1 has a hexagonal-cross-sectioned portion 112 and a truncated conical portion 113 which is located immediately under the hexagonal-cross-sectioned portion 112 and which decreases in diameter in a downward direction. The hexagonal-cross-sectioned portion 112 and the truncated conical portion 113 constitute cooperatively a nozzle seat which is shaped to conform with the lower end portion of the nozzle 211 of the vapor tube 21 so as to engage the lower end portion of the nozzle 211 fittingly within the nozzle seat, thereby establishing a liquid-tight seal between the lower end portion of the nozzle 211 and the sleeving portion 11 of the sleeve 1.

As shown in FIGS. 2 and 3, the sleeving portion 11 of the sleeve 1 has a C-shaped inwardly extending flange 114 which has an inclined underside 115 that abuts against a truncated conical top surface 212 of the nozzle 211, thereby confining the nozzle 211 within the nozzle seat. The C-shaped inwardly extending flange 114 has two ends between which a gap 116 is defined.

With this invention thus explained, it is apparent that numerous modifications and variations can be made without departing from the scope and spirit of this invention. It is therefore intended that this invention be limited only as indicated in the appended claims.

I claim:

1. A bubble-forming sleeve adapted to be coupled with an espresso coffee maker and adapted to be immersed into a beverage within a container, the coffee maker being provided with a vapor tube which has a lower end that is provided with a nozzle, the nozzle having a top surface, and a lower end portion from which vapor flows downward, said sleeve comprising:

a generally vertical sleeving portion which is located at an upper end portion of said sleeve and which is adapted to be sleeved fixedly on the nozzle in such a manner that a liquid-tight seal is established therebetween, said sleeve having a central bore formed therethrough; and a mixing portion attached around a lower end portion of said sleeving portion and adapted to be immersed entirely into the beverage within the container, said mixing portion having a downwardly opened mixing chamber which is located under and which is communicated fluidly with said central bore of said sleeving portion so as to be adapted to permit vapor flow from the nozzle of the vapor tube into said chamber of said sleeve, and a generally vertical air passage unit having a lower end which is communicated fluidly with said chamber, and an upper end which is communicated fluidly with an exterior of said sleeve;

whereby, heated vapor can flow downward from said chamber of said mixing portion so as to heat the beverage in the container and so as to draw the beverage in the container into said chamber via said air passage unit, according to principle of a venturi tube, thereby forming bubbles of the beverage in the container.

2. A bubble-forming sleeve as claimed in claim 1, wherein said sleeve is unitary and is made of a heat-resistant elastic material, said sleeving portion of said sleeve having a nozzle seat which is formed therein and which is adapted to be shaped to conform with the lower end portion of the nozzle of the vapor tube so as to be adapted to engage the lower end portion of the nozzle fittingly within said nozzle seat, thereby establishing a liquid-tight seal between the lower end portion of the nozzle and said sleeving portion of said sleeve.

3. A bubble-forming sleeve as claimed in claim 2, wherein said central bore of said sleeving portion of said sleeve has a hexagonal-cross-sectioned portion and a truncated conical portion which constitute cooperatively said nozzle seat, said truncated conical portion being located immediately under said hexagonal-cross-sectioned portion and decreasing in diameter in a downward direction.

4. A bubble-forming sleeve as claimed in claim 2, wherein said sleeving portion of said sleeve has a C-shaped inwardly extending flange which has an underside that is adapted to abut against the top surface of the nozzle, thereby confining the nozzle within said nozzle seat.

* * * * *